R. TINKER.
VEHICLE COUPLING.
APPLICATION FILED JUNE 16, 1917.
1,285,841.
Patented Nov. 26, 1918.
2 SHEETS—SHEET 1.
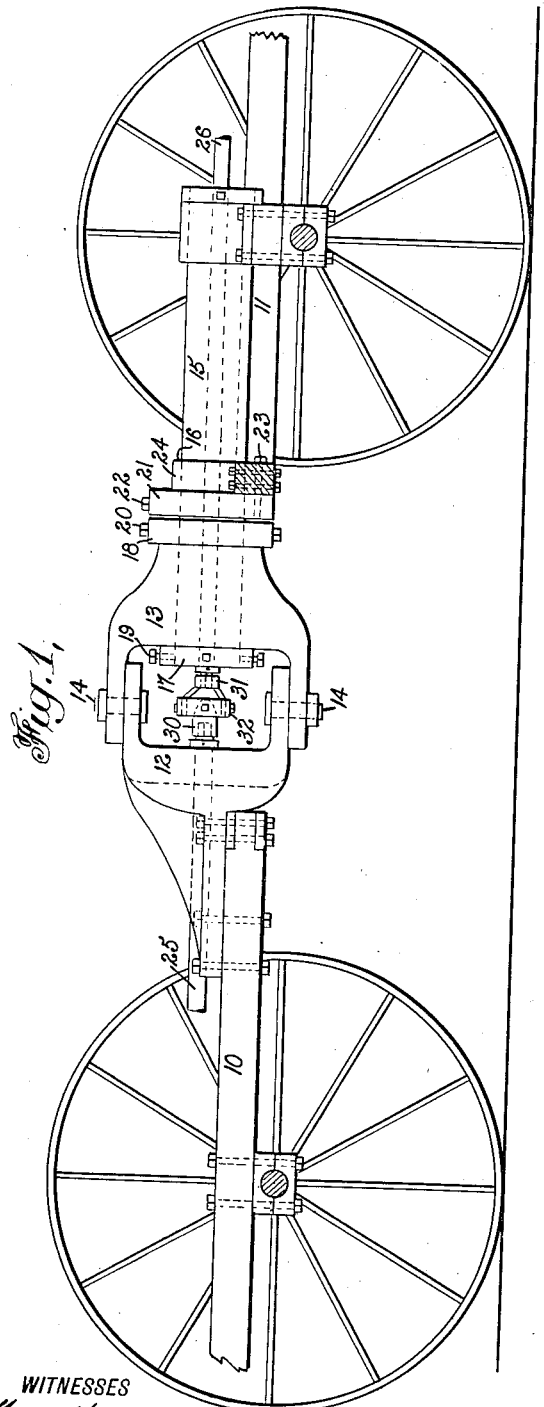
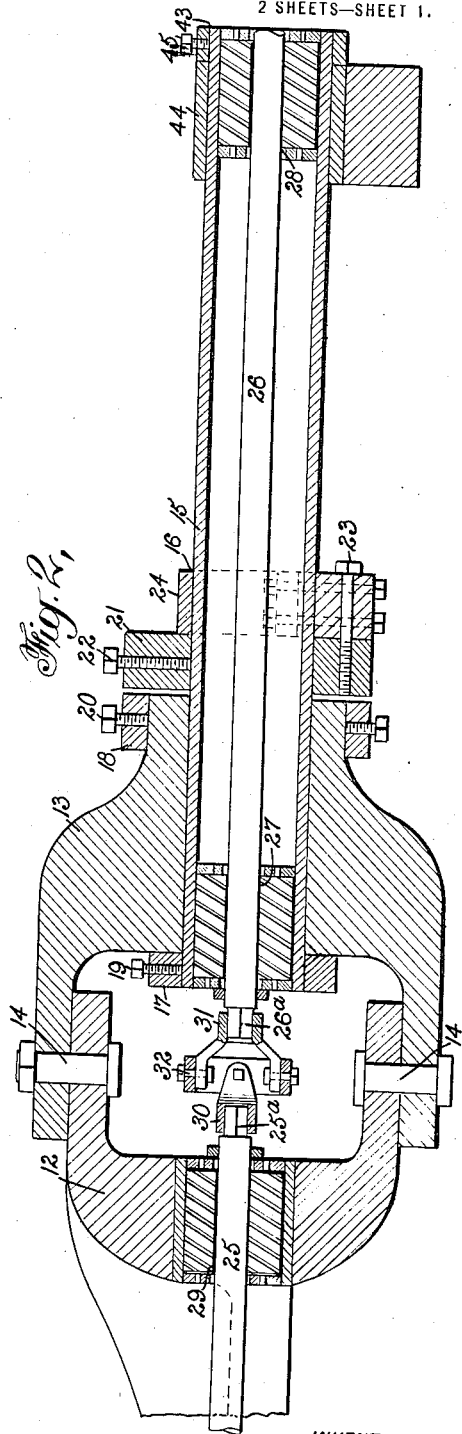
WITNESSES
INVENTOR
Ralph Tinker
BY
ATTORNEYS R. TINKER.
VEHICLE COUPLING.
APPLICATION FILED JUNE 16, 1917.
1,285,841.
Patented Nov. 26, 1918.
2 SHEETS—SHEET 2.
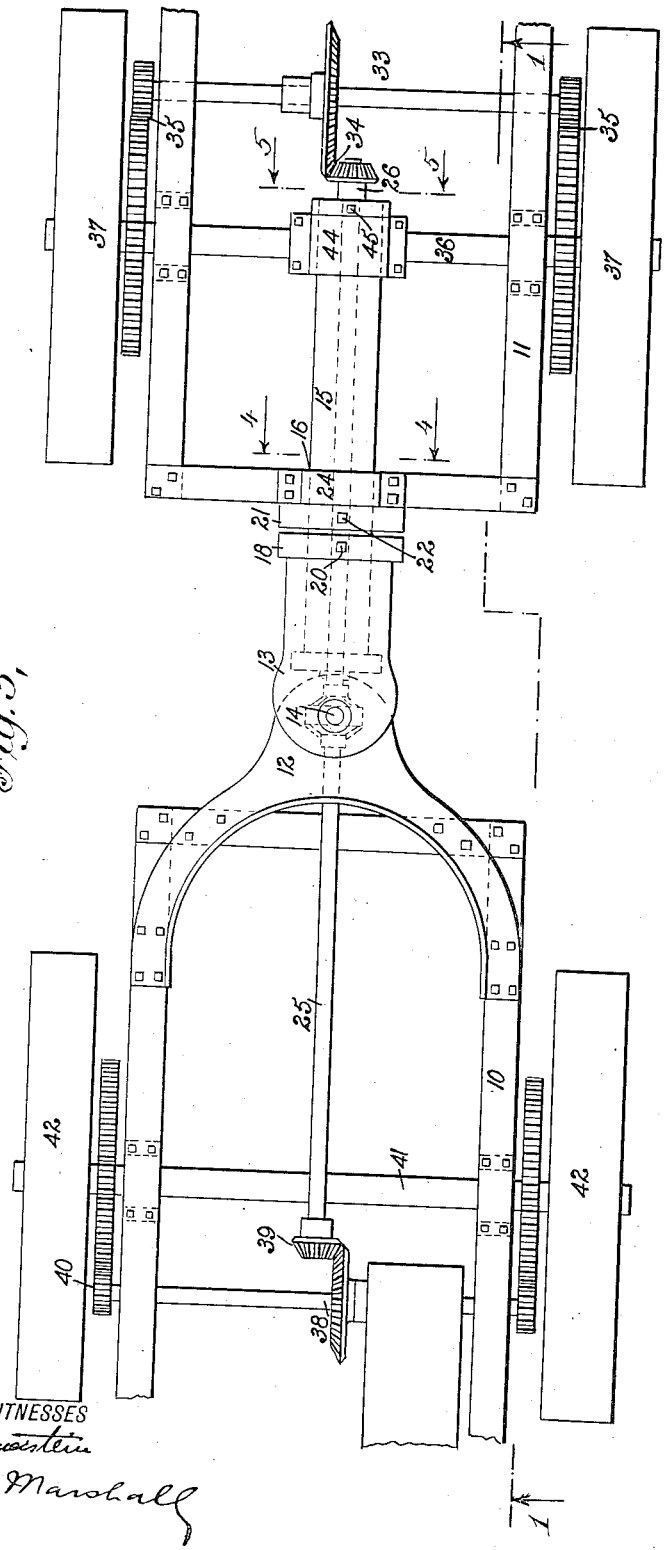
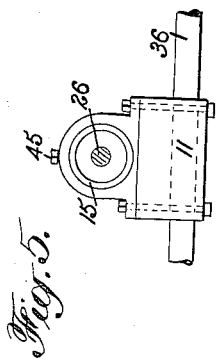
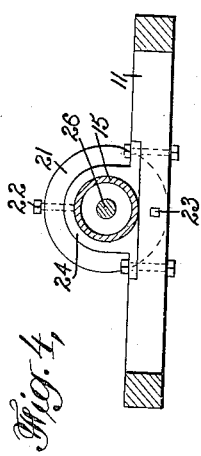
WITNESSES
INVENTOR
Ralph Tinker
BY
ATTORNEYS

UNITED STATES PATENT OFFICE.

RALPH TINKER, OF LITTLE YORK, ILLINOIS.

VEHICLE-COUPLING.

1,285,841.    Specification of Letters Patent.    Patented Nov. 26, 1918.

Application filed June 16, 1917. Serial No. 175,125.

*To all whom it may concern:*

Be it known that I, RALPH TINKER, a citizen of the United States, and a resident of Little York, in the county of Warren and State of Illinois, have invented a new and Improved Vehicle-Coupling, of which the following is a full, clear, and exact description.

My invention has for its object to provide a coupling for vehicles designed to be used on all motor and power vehicles, through which power may be supplied from a motor on one of the vehicle parts to tractor wheels on which the coupled vehicle parts are mounted. It is also possible with this construction to steer the vehicle with either the forward or rear tractor wheels.

Additional objects of the invention will appear in the following specification, in which the preferred form of the invention is disclosed.

In the drawing similar reference characters denote similar parts in all the views, in which—

Figure 1 is a side elevation showing my vehicle coupling as applied to a vehicle body;

Fig. 2 is an enlarged sectional fragmentary view illustrating the construction of the coupling;

Fig. 3 is a plan view of Fig. 1;

Fig. 4 is a sectional view on the line 4—4 of Fig. 3; and

Fig. 5 is a sectional view on the line 5—5 of Fig. 3.

By referring to the drawings it will be seen that the vehicle has two parts 10 and 11, the vehicle part 10 having a bracket 12 and the vehicle part 11 having a bracket 13. The brackets 12 and 13 are pivoted together by bolts 14 which are in alinement with each other. The bracket 13 is mounted on a sleeve 15, this sleeve 15 being journaled in a bearing 16 of the vehicle part 11. While the bracket 13 may be rocked on the sleeve 15, it is prevented from moving longitudinally of the sleeve 15 by means of collars 17 and 18 which are mounted on the sleeve 15 and are held in place by set screws 19 and 20. Another collar 21 is mounted on the sleeve 15 beyond the collar 18, this collar 21 being held in place on the sleeve 15 by set screws 22. The collar 21 is held against movement relatively to the vehicle part 11 by means of a bolt 23 which secures a member 24 of the vehicle part 11 to the collar 21.

Any suitable means may be disposed in the sleeve 15 and may be employed with a transmission member on the part 11 by which a motor on one of the vehicle parts may be used for driving the transmission members which are coupled to the tractor wheels on the vehicle parts 10 and 11; but, as illustrated in the drawings, I prefer to make use of shafts 25 and 26 as power transmission members, the shaft 26 being journaled in bearings 27 and 28 in the sleeve 15, and the shaft 25 being journaled in the bearing 29 in the bracket 12. The adjacent ends of the shafts 25 and 26 have portions $25^a$ and $26^a$ which are angular in cross-section, and on which members 30 and 31 of a universal joint 32 are mounted. It will be understood that with this construction the members 30 and 31 of the universal joint 32 may move slightly longitudinally of the shafts 25 and 26 as may be necessary to give the shafts the greatest freedom of movement, the universal joint 32 being centered substantially in alinement with the bolts 14. The vehicle part 11 has bearings in which a shaft 33 is journaled, the shaft 26 being connected with the shaft 33 by means of gearing 34, and the shaft 33 being connected by means of gearing 35 with an axle 36 on which tractor wheels 37 are mounted. In a similar manner the shaft 25 is connected with a shaft 38 journaled in bearings in the vehicle part 10 by means of gearing 39, and this shaft 38 is connected by means of gearing 40 with an axle 41 journaled in bearings in the vehicle part 10 and on which the tractor wheels 42 are mounted.

It will be seen by referring to Figs. 2 and 3 of the drawings, that the sleeve 15 is not only secured in the bearing 16 on the member 24 of the vehicle part 11, but it is also secured in a second bearing 43 on a member 44 of the vehicle part 11, a set screw 45 being provided which prevents the sleeve 15 from rotating relatively to the vehicle part 44.

It will be understood that not only is it possible with this construction to conveniently and effectively drive the tractor wheels 37 and 42 from a motor disposed on one of the vehicle parts 10 or 11, but that it is also possible to direct the movement of the vehicle by a lateral movement of either of the vehicle parts 10 and 11.

Having thus described my invention, I claim as new and desire to secure by Letters Patent:

1. In a vehicle coupling, a frame having a bracket at one end, a second frame having a longitudinal bearing, a sleeve disposed in the bearing, a bracket rotatably mounted on the sleeve, the brackets being pivoted together on a vertical axis, means to secure the collar to the sleeve, means to secure the collar to the bearing, a bearing in the sleeve, a shaft journaled in the second mentioned bearing, a bearing in the first frame, a shaft journaled in the third bearing, and means substantially in alinement with the axis of the pivot connecting the brackets by which one shaft is adapted to drive the other shaft.

2. In a vehicle coupling, a frame having a bracket at one end, a second frame having a longitudinal bearing, a sleeve disposed in the bearing, a bracket rotatably mounted on the sleeve, the brackets being pivoted together on a vertical axis, means securing the sleeve to the bearing, means to limit the longitudinal movement of the second bracket on the sleeve, a bearing in the sleeve, a shaft journaled in the bearing, a bearing on the first frame, a shaft journaled in the third bearing, and means substantially in alinement with the axis of the pivot connecting the brackets by which one shaft is adapted to drive the other shaft.

3. In a vehicle coupling, a frame having a bracket at one end, a second frame having a bracket at one end, the brackets being pivoted together on a vertical axis, a longitudinally extending sleeve secured to the first frame on which the bracket is rotatably mounted, a power transmission member disposed in the sleeve, a power transmission member mounted on the second frame, and coupling means adjacent the brackets connecting the power transmission members.

4. In a vehicle coupling, a frame having a bracket at one end, a second frame having a bracket at one end, the brackets being pivoted together on a vertical axis, a longitudinally extending sleeve secured to the first mentioned frame on which the first mentioned bracket is rotatably mounted, a bearing in the sleeve, a shaft journaled in the bearing, a bearing in the second frame, a shaft journaled in the second mentioned bearing, and coupling means adjacent the brackets connecting the shafts.

5. In a vehicle coupling, a frame having a bracket at one end, a second frame having a bracket at one end, the brackets being pivoted together on a vertical axis, a longitudinally extending sleeve secured to the first mentioned frame on which the first mentioned bracket is rotatably mounted, a bearing in the sleeve, a shaft journaled in the bearing, a bearing on the second frame, a shaft journaled in the second mentioned bearing, coupling means adjacent the brackets connecting the shafts, tractor wheels mounted on the frames, and means connecting the shafts with the tractor wheels for rotating the latter.

6. In a vehicle coupling, a frame having a bracket at one end, a second frame having a bracket at one end, the brackets being pivoted together on a vertical axis, a longitudinally extending sleeve secured to the first mentioned frame on which the first mentioned bracket is rotatably mounted, a bearing in the sleeve, a shaft journaled in the bearing, a bearing on the second frame, a shaft journaled in the second bearing, the shaft adjacent the pivot being angular in cross section, and a coupling member having portions with angular openings mounted on the angular portions of the shafts for the purpose specified.

RALPH TINKER.